United States Patent
Thöm

(10) Patent No.: US 8,209,635 B2
(45) Date of Patent: Jun. 26, 2012

(54) SYSTEM AND METHOD FOR DYNAMICALLY CHANGING A DISPLAY

(75) Inventor: Karl Ola Thöm, Malmo (SE)

(73) Assignee: Sony Mobile Communications AB, Lund (SE)

( * ) Notice: Subject to any disclaimer, the term of this patent is extended or adjusted under 35 U.S.C. 154(b) by 828 days.

(21) Appl. No.: 11/960,767

(22) Filed: Dec. 20, 2007

(65) Prior Publication Data

US 2009/0164896 A1    Jun. 25, 2009

(51) Int. Cl.
- *G06F 3/048* (2006.01)
- *G03B 13/00* (2006.01)
- *G06F 3/033* (2006.01)
- *G06K 9/00* (2006.01)
- *G09G 5/00* (2006.01)
- *H04H 60/56* (2008.01)
- *H04N 5/232* (2006.01)
- *H04N 7/14* (2006.01)
- *H04W 4/00* (2009.01)

(52) U.S. Cl. ........ 715/863; 345/156; 345/660; 345/649; 345/656; 345/667; 348/14.01; 348/352; 382/103; 382/117; 455/422.1; 715/788; 725/12

(58) Field of Classification Search .................. 715/863, 715/788; 382/103, 117; 725/12; 345/156, 345/660, 649, 656, 667; 348/14.01, 352; 455/422.1

See application file for complete search history.

(56) References Cited

U.S. PATENT DOCUMENTS

| | | | |
|---|---|---|---|
| 5,731,805 A * | 3/1998 | Tognazzini et al. | 345/156 |
| 6,288,704 B1 | 9/2001 | Flack et al. | |
| 6,822,662 B1 * | 11/2004 | Cook et al. | 715/788 |
| 7,535,486 B2 * | 5/2009 | Motomura et al. | 348/158 |
| 7,555,141 B2 * | 6/2009 | Mori | 382/103 |
| 7,581,186 B2 * | 8/2009 | Dowdy et al. | 715/727 |
| 2003/0093600 A1 | 5/2003 | Perala et al. | |
| 2005/0030322 A1 * | 2/2005 | Gardos | 345/667 |
| 2005/0134504 A1 * | 6/2005 | Harwood et al. | 342/357.14 |
| 2005/0229200 A1 * | 10/2005 | Kirkland et al. | 725/12 |
| 2007/0019000 A1 | 1/2007 | Motomura et al. | |
| 2007/0192722 A1 | 8/2007 | Kokubo | |
| 2007/0250868 A1 | 10/2007 | Konno et al. | |

FOREIGN PATENT DOCUMENTS

| | | |
|---|---|---|
| EP | 1316877 | 6/2003 |
| EP | 1484665 | 12/2004 |
| EP | 1826993 | 8/2007 |
| WO | 02093483 | 11/2002 |
| WO | 2007003195 | 1/2007 |

OTHER PUBLICATIONS

International Search Report and Written Opinion from corresponding International Application No. PCT/IB08/001597.

* cited by examiner

*Primary Examiner* — Boris Pesin
*Assistant Examiner* — Elizabeth G Wright
(74) *Attorney, Agent, or Firm* — Renner, Otto, Boisselle & Sklar, LLP

(57) ABSTRACT

A technique for managing the display of content on a display of an electronic device may be based on a distance of the user to the display. The distance may be estimated by analyzing video data to detect a face of the user and establish a distance parameter based on a relationship between facial features. Based on this information, the displayed content may be adjusted to facilitate easy viewing of the displayed content, such as by changing the size of the displayed content, the layout of the displayed content, or the number of visual elements that make up the displayed content.

15 Claims, 4 Drawing Sheets

SYSTEM AND METHOD FOR DYNAMICALLY CHANGING A DISPLAY

TECHNICAL FIELD OF THE INVENTION

The technology of the present disclosure relates generally to displaying visual content on a display and, more particularly, to a system and method for controlling the displayed content based on how far a user is located from the display.

DESCRIPTION OF THE RELATED ART

Many electronic devices include a display to display content to a user. Content may include, for example, text, digital images (e.g., photographs and graphics), icons, menus and so on. One exemplary electronic device that includes a display is a mobile telephone. Recently, mobile telephones have become relatively powerful computing devices that may carry out functions in addition to making calls. For example, many mobile telephones can function as music players and cameras. Also, many mobile telephones allow a user to compose messages (e.g., text messages and electronic mail messages), read received messages, and access the Internet, among other functions.

The size of displayed content for a mobile telephone is often static. For instance, text is typically displayed using a predetermined font size, and images are displayed using a predetermined amount of the display. Therefore, to see displayed content clearly, the user must be within a comfortable viewing range of the display. Some mobile telephones allow the user to change the scale of displayed content to facilitate viewing and/or to display more or less detail. But these changes involve user interaction with the device.

SUMMARY

To enhance the display of visual content on a display of an electronic device, the present disclosure describes an improved technique for managing the size of content that is displayed and/or managing what content is displayed based on a distance of the user to the display. Distance of the user to the display may be determined using an imaging device. Image data from the imaging device may be analyzed to detect a face of the user. The size of facial features and/or a relationship between facial features may be used to approximate the distance between the display and the user. Based on this information, the size of the displayed content may be adjusted and/or the content that is displayed may be selected. In this manner, the user may position himself or herself at a desired distance from the electronic device and still may be able to comfortably see displayed content even if the distance is further away than would allow viewing of the content based on default display parameters. As an example, the user may browse the Internet while holding a mobile telephone at an arm's length or more than arm's length where one would ordinarily have to hold the mobile telephone at half of an arm's length to clearly see the displayed content.

According to one aspect of the disclosure, a method of controlling visual content that is displayed on a display of an electronic device includes analyzing a video signal to detect facial features of a user of the electronic device and to establish a parameter indicative of a distance of the user from the display based on the detected facial features; and adjusting the displayed content based on the parameter to facilitate user viewing of the displayed content at the indicated distance.

According to one embodiment of the method, the parameter is derived from a relationship between at least two of the detected facial features.

According to one embodiment of the method, the adjusting changes a size of visual elements from the displayed content.

According to one embodiment of the method, the size is changed by scaling the visual content.

According to one embodiment of the method, the content includes text and the size of the text is changed by at least one of changing point size of the text or changing a font of the text.

According to one embodiment of the method, the adjusting changes a layout of visual elements from the displayed content.

According to one embodiment of the method, the analyzing includes determining a viewing angle of the user with respect to the display and the adjusting includes non-uniformly varying a size of the displayed content across the display based on the viewing angle.

According to one embodiment of the method, the analyzing includes determining a relative orientation of the user to the electronic device and the adjusting includes rotating the orientation of the displayed content if the user and the electronic device have different orientations.

According to another aspect of the disclosure a second method of controlling visual content that is displayed on a display of an electronic device includes analyzing a video signal to detect facial features of a user of the electronic device and to establish a parameter indicative of a distance of the user from the display based on the detected facial features; displaying plural items of visual content when the indicated distance is less than a predetermined threshold; and detecting that the indicated distance has increased to be greater than the predetermined threshold and, upon the detection, removing at least one of the plural displayed items from the display and increasing a size of a remaining one of the items.

According to one embodiment of the second method, the parameter is derived from a relationship between at least two of the detected facial features.

According to one embodiment of the second method, the plural items of visual content are associated with a navigation application that provides directions to the user to reach a specified location.

According to one embodiment of the second method, the plural items of visual content are associated with an audio file that is undergoing playback during the displaying.

According to one embodiment of the second method, the item that is increased in size is artwork associated with the audio file.

According to another aspect of the disclosure, an electronic device includes an imaging device that generates a video signal containing a representation of a user of the electronic device; a display that displays visual content to the user; and a controller that analyzes the video signal to detect facial features of the user of the electronic device and that establishes a parameter indicative of a distance of the user from the display based on the detected facial features, and wherein the controller adjusts the displayed content based on the parameter to facilitate user viewing of the displayed content at the indicated distance.

According to one embodiment of the electronic device, the parameter is derived from a relationship between at least two of the detected facial features.

According to one embodiment of the electronic device, the adjustment is a change in a size of visual elements from the displayed content.

According to one embodiment of the electronic device, the size is changed by scaling of the visual content.

According to one embodiment of the electronic device, the content includes text and the size of the text is changed by at least one of changing point size of the text or changing a font of the text.

According to one embodiment of the electronic device, the adjustment is a change in a layout of visual elements from the displayed content.

According to one embodiment of the electronic device, the controller determines a viewing angle of the user with respect to the display and the adjustment to the displayed content includes non-uniformly varying a size of the displayed content across the display based on the viewing angle.

According to one embodiment of the electronic device, the controller determines a relative orientation of the user to the electronic device and the adjustment to the displayed content includes rotating the orientation of the displayed content if the user and the electronic device have different orientations.

According to one embodiment, the electronic device further includes call circuitry to establish a call over a network.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
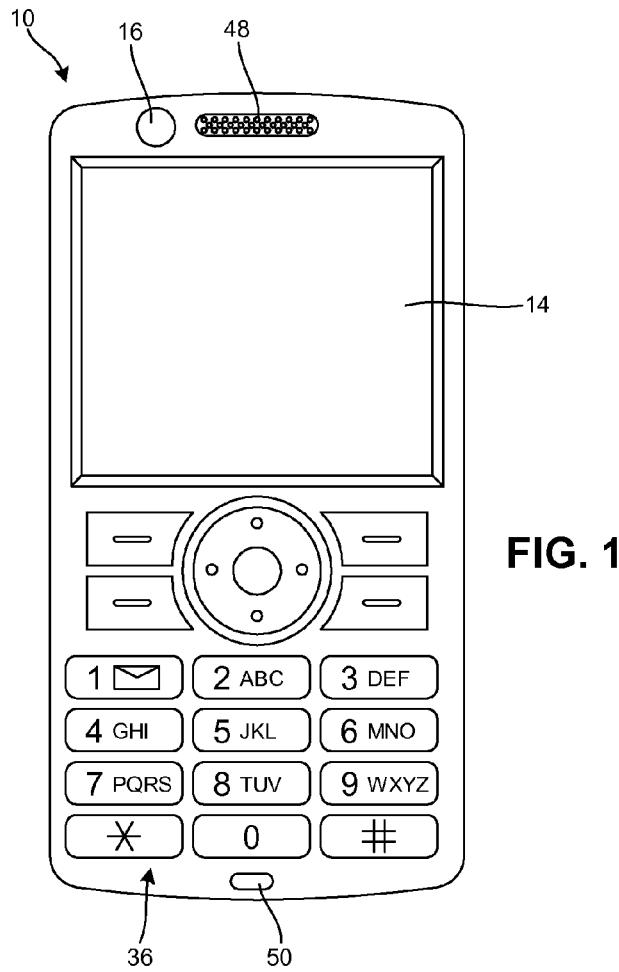
FIG. 1 is a schematic view of a mobile telephone as an exemplary electronic device that adjusts displayed content based on a distance of a user from a display of the mobile telephone.

Embodiments will now be described with reference to the drawings, wherein like reference numerals are used to refer to like elements throughout. It will be understood that the figures are not necessarily to scale.

In the present document, embodiments are described primarily in the context of a mobile telephone. But it will be appreciated that the described techniques could be carried out in operational environments other than the mobile telephone. Therefore, the term electronic device, as used herein, may relate to any type of appropriate electronic equipment, examples of which include a portable radio communication device (also referred to as a mobile radio terminal), a pager, a communicator, an electronic organizer, a personal digital assistant (PDA), a smartphone, a media player (e.g., an MP3 player and/or a video player), a gaming device, an accessory, and a computer. Also, the display may be part of a separate device from a device that generates a video signal that drives the display. For example, the device that generates the video signal may be a gaming device and the display may be part of a television.

Figure 2:
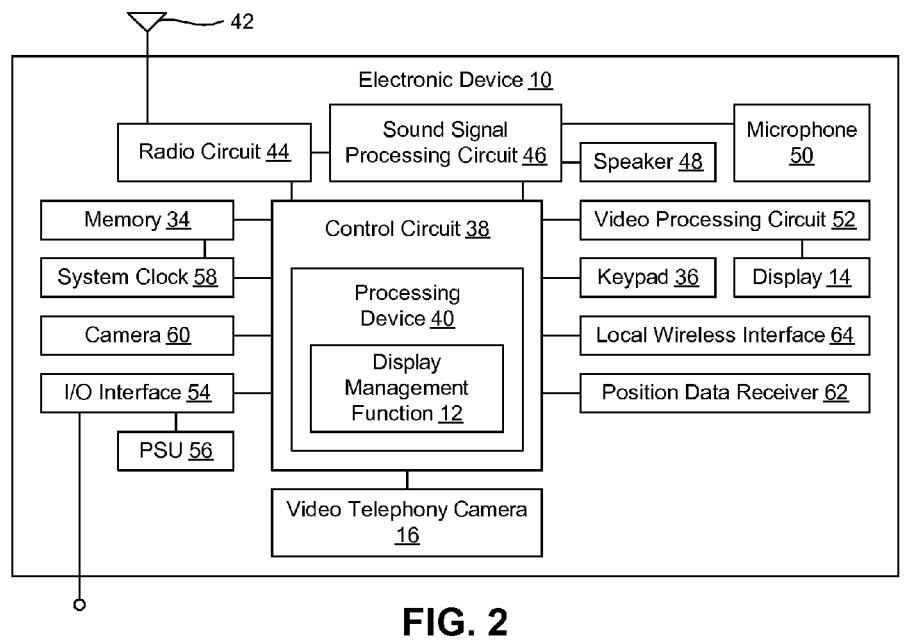
FIG. 2 is a schematic block diagram of the mobile telephone of FIG. 1.

Referring initially to FIGS. 1 and 2, an electronic device 10 is shown. The electronic device 10 includes a display management function 12 that is configured to adjust the size and/or type of content that is displayed on the display 14 depending on a distance between a user and the electronic device 10. Additional details and operation of the display management function 12 will be described in greater detail below. The display management function 12 may be embodied as executable code that is resident in and executed by the electronic device 10. In one embodiment, the display management function 12 may be a program stored on a computer or machine readable medium. The display management function 12 may be a stand-alone software application or form a part of a software application that carries out additional tasks related to the electronic device 10.

The electronic device 10 may include an imaging device 16. The imaging device 16 of the illustrated embodiment is a camera that is directed toward the user while the user views the display 14. These types of cameras are available on some mobile telephones to facilitate video telephone calls (also referred to as video telephony). The imaging device 16 may generate a video signal containing a representation of objects in the field of view of the imaging device 16. The video signal may be analyzed by the display management function 12 to identify facial features using a face detection algorithm. The identification of a face may indicate that a user is viewing the display 14.

Features of an identified phase may be analyzed to determine a distance between the user and the display 14. In the illustrated embodiment, the imaging device 16 is located adjacent the display 14 and there is little difference in the distance between the user and either one of the display 14 or the imaging device 16. In other embodiments, there may be a more substantial difference between these distances. In this event, the difference in distance may be included in any calculations to determine the distance between the user and the display 14.

Figure 3:
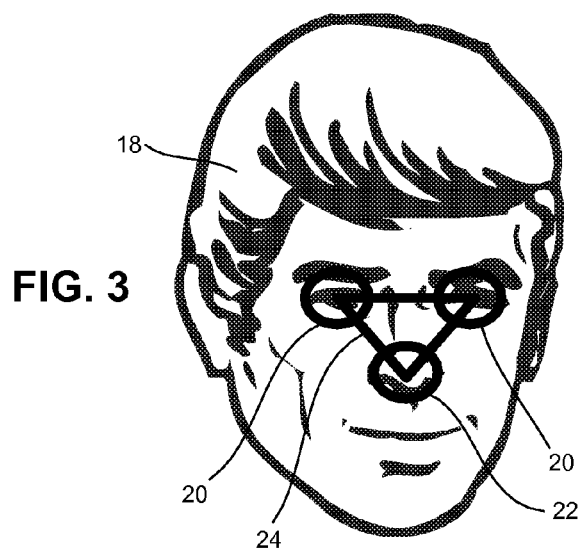
FIG. 3 is a schematic view of an image of user's face that has been processed to determine the distance of the user from the display.

With additional reference to FIG. 3, any suitable face detection and/or face recognition technique may be used as part of determining a distance between the user and the display 14. Face detection, for example, may be carried out using binary pattern classification where the output of the imaging device 16 is transformed into features and a classifier decides whether the image contains a face or some other body part, such as a torso or a hand.

One exemplary technique for identifying a face 18 is to analyze image data from the video stream that is generated by the imaging device 16 to detect the presence of a pair of eyes 20 located symmetrically about the bridge of the nose 22. FIG. 3 schematically represents the face 18 of the user that has been detected by the presence of these features. In one embodiment, a triangle 24 may be formed by connecting the locations of the eyes 20 and tip of the nose 22. Using a known focal length for the imaging device 16, the size of the triangle 24 may be indicative of how far the user is located from the display 14. For instance, a relatively large triangle 24 would indicate that the user is close to the display 14 and a small triangle 24 would indicate that the user is far away from the display 14. In one embodiment, an estimated distance may be calculated. In another embodiment, the size of the triangle 24 may be compared against a threshold. If the size of the triangle 24 is larger than the threshold, the display management function 12 may present content for a close proximity user and, if the size of the triangle 24 is smaller than the threshold, the display management function 12 may present content for a distant proximity user. Multiple thresholds may be used to provide multiple corresponding content display techniques based on a range of possible distances of the user to the display. In this approach, changes to the display based on distance of the user to the display may be made in stepped increments as the distance surpasses or falls below a threshold.

While natural variations in the spacing of facial features may occur from person to person, it is possible to estimate user distance to the display based on a carefully selected threshold that is appropriate for a large percentage of the population. In an exemplary embodiment, the threshold may be selected to correspond to a user distance of about 18 inches (e.g., about 45 centimeters) from the display to about 24 inches (e.g., about 60 centimeters) from the display. In one embodiment, the distance analysis may be calibrated for a person who most frequently uses the electronic device 10.

Alternatively, instead of threshold comparisons, a value indicative of an estimated distance between the user and the display may be generated. Then, the display of content may be adjusted based on the value. In this approach, changes to the display based on distance of the user to the display may be made in stepped increments or in a smoother progression.

It will be appreciated, that other techniques based on an identified face may be employed for determining a distance between a user and the display 14. For example, the size of facial features (e.g., the size of the eyes 20 or the size of the entire face) may be used, the distance between facial features (e.g., the distance between the eyes 20) may be used, or a shape made by connecting facial features other than the eyes 20 and the tip of the nose 22 may be used. Silhouette detection also may be used to detect the user and the distance between the user and the display 14.

If no face is detected, then an assumption may be made that any user that is viewing the display 14 is at a relatively far distance from the display 14. If partial facial features are detected (e.g., when the user's face is turned or at an angle relative to the optical axis of the field of the view of the imaging device 16), then a distance assumption may be made based on a default value or by analyzing partial facial features (e.g., a single eye and a nose). Also, if multiple faces are detected, the distance of one of the faces to the display 14 may be used for the determined distance. For example, the distance of the closest face to the display 14 may be used.

The video signal from the imaging device 16 may be used in other manners to estimate the distance between the user and the display 14. For example, eye tracking or face recognition (e.g., ascertaining an identity of the user) may be used. Exemplary facial recognition techniques that could be employed include eigenface, fisherface, the Hidden Markov Model, neuronal motivated dynamic link matching and three-dimensional face recognition.

Instead of, or in addition to, face detection and/or face recognition, other objects or body parts could be used, such as the user's hand. A hand may be used, for example, when the electronic device 10 is positioned so that a face is unlikely to be in the field of view of the imagining device 16. For example, if the electronic device 10 were used in a vehicle as a navigation assistance device (e.g., a GPS navigator), the user may wave his or her hand in front of the imaging device 16 at a distance corresponding to a desired scale of the displayed content or a desired amount of displayed information (e.g., a map or text-based navigation cues).

In one embodiment, the face detection and distance determination may be carried out following the launching of an application and other user initiated action with the electronic device. The face detection and distance determination may last a predetermined amount of time, until the display management function has made a distance determination, or until a determination has been made that no face is present in the image field. Periodic updates to the distance determination may be made. For instance, every minute or every other minute, the face detection and distance determination may be carried out to revise the distance determination.

Once a distance determination has been made, the display management function 12 may control the size of the content that is displayed on the display in a manner that is appropriate for the distance to facilitate clear viewing of the content by the user. In one embodiment, a database (e.g., a look-up table) may be constructed that contains content size information for various distances. For each distance, the size information may include fonts and/or point sizes that may be appropriate for the distance, scaling or magnification values that may be appropriate for the distance, layout and/or visual object spacing data that may be appropriate for the distance, icon size that may be appropriate for the distance, and so forth. In addition to sizing the content, or instead of sizing the content, the display management function may control the content that is displayed based on the distance determination. For instance, while playing music under a determination that a user is close to the display, album cover art may be displayed with artist information, song information and playback data. But if the distance determination indicates that the user is relatively far from the display, only the album cover art may be displayed.

Using the combined distance and sizing information, the display management function 12 may control the display of content. The layout of content on the display may be dynamically controlled using any appropriate technique. Exemplary techniques include, changing font and/or point size of displayed text, modifying a layout that is based on extensible markup language/extensible Hypertext markup language (XML/xhtml), modifying a layout that is based on scalable vector graphics (SVG), etc.

Changing the size of displayed content and/or the content itself based on the determined distance of the user from the display 14 may be used in connection with other user interface features to navigate through screens. For example, scroll bars, tabs and other conventional functionality may still be available to user, even if the content is displayed with different size and/or changed based on the distance determination.

There are a number of ways in which content and/or visual layout of the display 14 may be managed depending on the distance between the user and the display. Some of the ways of managing the display of content may be based on the type of device, the size of the display, and/or the operational mode of the device (e.g., which application(s) is running and/or the task that the user is carrying out). Several exemplary ways of controlling the content based on distance between the user and the display are described below. It will be appreciated that the illustrated and described content management techniques are not an exhaustive list, and can be applied in any operational context (e.g., not just in the illustrated exemplary contexts of a computer and a mobile telephone).

Figure 4:
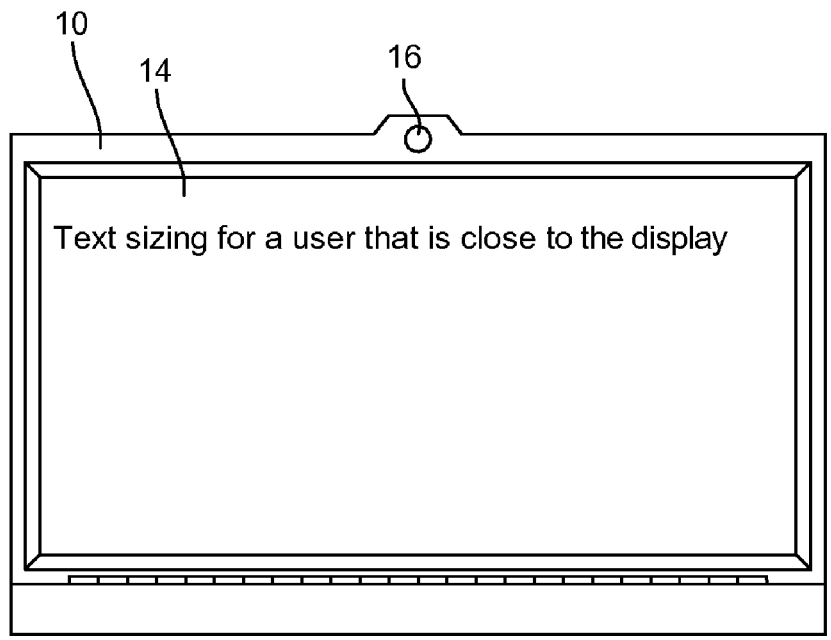
FIGS. 4 and 5 are schematic diagrams of a laptop computer as another exemplary electronic device where the size of displayed text has been adjusted based on a distance of the user from the display.
Figure 5:
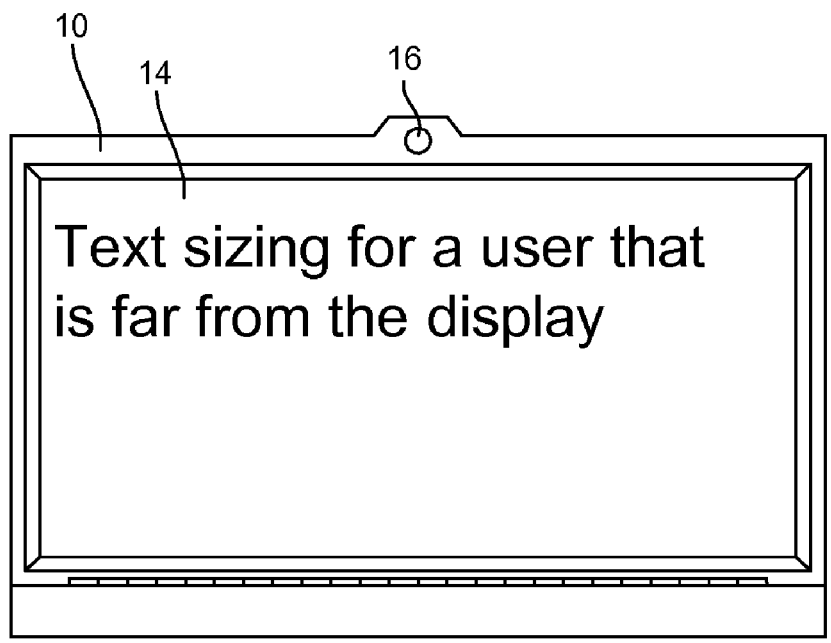

With additional reference to FIGS. 4 and 5, shown is an exemplary electronic device 10 in the form of a laptop computer that includes the display 14 and the imaging device 16. The imaging device 16 may be integrated into the electronic device 10 or may be operatively connected to the electronic device 10. In the embodiment of FIGS. 4 and 5, the imaging device 16 may be a "web" camera, for example.

In this embodiment, the distance between the user and the display 14 is determined as described in greater detail above. Based on this determination, text that is displayed on the display 14 may be sized in coordination with the determined distance. For instance, in FIG. 4, the text appears relatively small on the display 14 for when the user is located relatively close to the display 14 and, in FIG. 5, the text appears relatively large on the display for when the user is located relatively far away from the display 14. In one embodiment, the text is scaled or changed in point size on a dynamic basis based on the distance of the user to the display. In another embodiment, the font may be selected based on distance of the user to the display.

In addition to dynamically changing the text size and/or changing the font(s), other changes to the layout of text and/or images may be made. In one embodiment, the spacing between visual elements of the displayed content may be changed. In another embodiment, the number of columns in which text is presented may be changed. In another embodiment, the transparency of text and/or graphics may be changed (e.g., if the user is relatively far away, transparence may be decreased to increase readability and/or visual clarity). In another embodiment, an amount of blur associated with graphics may be changed.

Also, the visual layout of the display may be changed depending on the distance between the user and the display 14. For instance, visual elements may be rearranged based on the distance. Also, when the user is "far away," visual elements may be removed and remaining visual elements may be increased in size and when the user is "close-up," relatively more visual elements may be displayed. In another embodiment, the foreground and/or background may be adjusted depending on the determined distance. For example, windows that are side-by-side or staggered relative to one another when the user is close may be arranged in an overlapping manner and/or in a layered manner when the user is far away.

Figure 6:
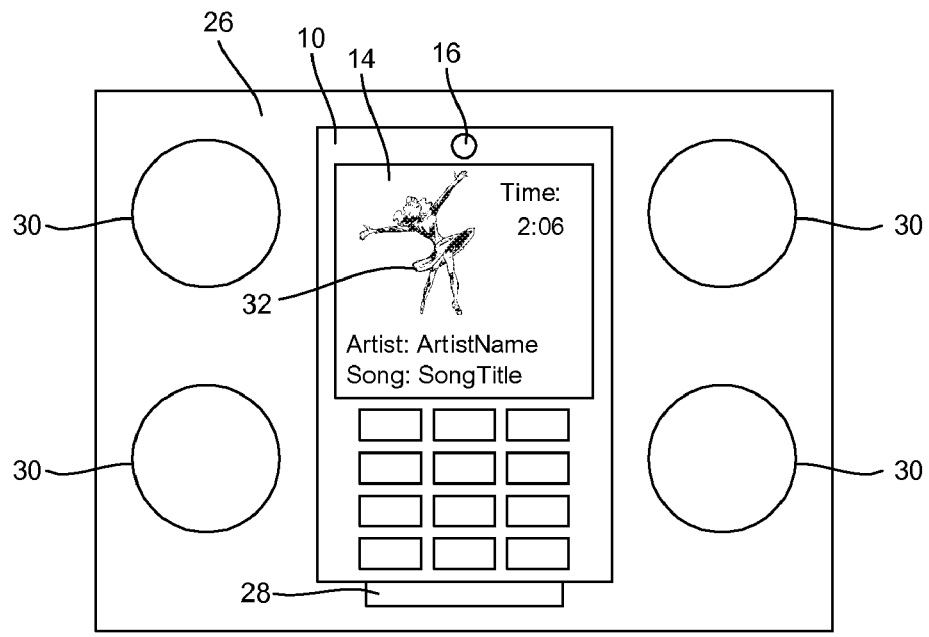
FIGS. 6 and 7 are schematic views of the mobile telephone of FIG. 1 mounted to a desktop music stand where the size and type of displayed content has been adjusted based on a distance of the user from the display.
Figure 7:
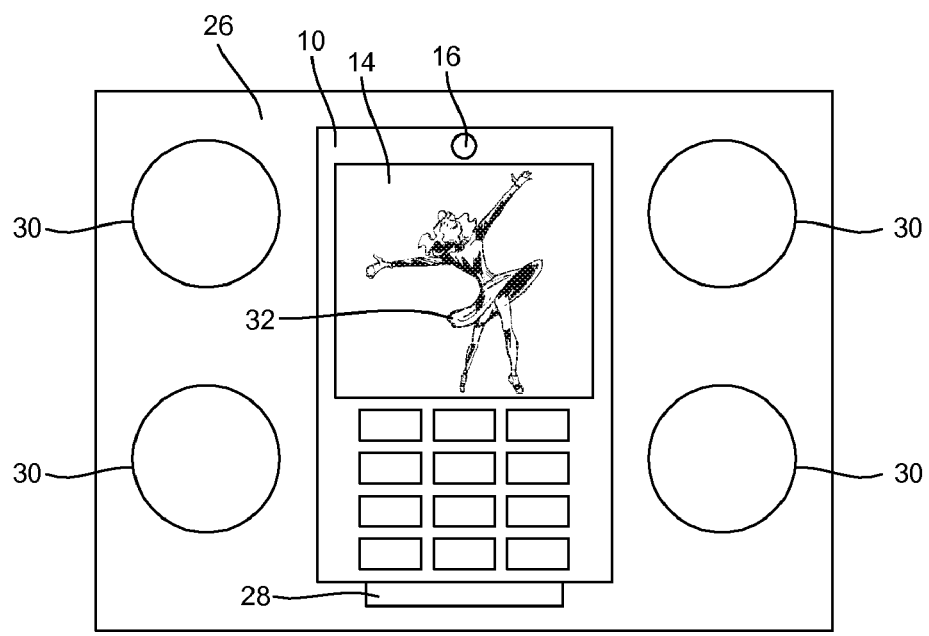

With additional reference to FIGS. 6 and 7, shown is an exemplary embodiment where the mobile telephone of FIGS. 1 and 2 is mounted to (e.g., docked to) a desktop music stand 26 by way of an electrical connector 28. The desktop music stand 26 may include one or more speakers 30 that outputs sounds corresponding to a music file or other audio content that is played back using the electronic device 10. In the illustrated embodiments, the electronic device 10 is actively playing back an audio file. The audio file may have an associated title (referred to in FIG. 6 as "SongTitle") and may have been recorded or performed by an associated artist (referred to in FIG. 6 as "ArtistName"). The audio file also may have an associated image, such as cover art 32. The cover art 32 may be artwork (e.g., illustrated or simulated subject matter and/or photographic subject matter) that is associated with an album or CD upon which the song was originally released.

The distance between the user and the display 14 may be determined as described in greater detail above. Based on this determination, the content that is displayed on the display 14 may be selected. For instance, if the viewer is relatively close to the display 14, such as less than two or three feet from the display 14, then the display management function 12 may control the electronic device 10 to display multiple visual items associated with the audio file. In the illustrated embodiment of FIG. 6, the display content includes the artist's name (e.g., "ArtistName"), the song's title (e.g., "SongTitle"), the cover art 32, and playback information in the form of remaining playtime for the audio file. In this embodiment, the cover art 32 is sized to consume a portion of the display 14 area, but no the entire display. It will be appreciated that other visual items may be displayed instead of or in addition to these items.

If it is determined that the user is relatively far away from the display 14, the displayed content may be changed. For example, in the illustrated embodiment of FIG. 7, text-based visual elements have been removed from the display and the cover art 32 has been enlarged to take up a larger amount of the display 14 than if the user were closer to the display 14.

It will be appreciated that the illustrated embodiments are just some of the ways in which displayed content may be changed based on a distance between the user and the display 14 of an electronic device 10. In another embodiment, a portion of a displayed photograph and the size of the displayed portion may be based on the user's distance from the display 14. For example, if the user is relatively close to the display 14, the entire photograph may be displayed, but of the user is relatively far from the display 14, the display management function 12 may "zoom-in on" a portion of the photograph. This magnified portion of the photograph may be displayed so as to take up a larger portion of the display 14 than if the same portion of the photograph were displayed without magnification. The rest of the photograph may be omitted from display, but may be viewed by using scroll bars or another navigation method to change the portion of the photograph that is displayed. The portion that is displayed with magnification may be a predetermined portion of the photograph, such as a center portion. Alternatively, the portion may be based on a characteristic of the photograph, such as light balance, color patterns, a facial feature that is detected by analyzing the image data associated with the photograph, etc.

The technique of magnifying content for display when the user is relatively far from the display 14 may be applied to content other than photographs, such as maps, Internet pages, contact lists, messages, and so forth. Also magnifying content may be combined with other changes to the manner in which the content is displayed.

Another technique for managing the display of content based on the distance of the user to the display 14 is to change the scale and/or layout of a graphical user interface (GUI). Changes may be applied based on the activity in which the user is engaged. For instance, if an active window is not maximized to occupy all or nearly all of the display and the user is determined to be relatively far away, the active window may be automatically maximized to enhance viewing. Also, menu bars, system trays and other non-active components of the GUI may be removed to provide more space for active regions components to enhance viewing. These types of changes may be useful, for example, when browsing the Internet or watching a movie and the user is at a distance from the display 14.

In one embodiment, the electronic device 10 may be used as a personal navigator to display a map. In one operational mode, directions to a user-specified destination may be provided and the map may be dynamically updated as the electronic device 10 travels. The electronic device 10 may be a dedicated navigation device (also referred to as a global positioning system (GPS) device) or another device that has a navigation function, such as a suitably equipped mobile telephone, a personal digital assistance or a computer. When functioning in this type of navigational mode, the display of content may be managed based on the distance of the user to the display 14. For instance, when the user is relatively close to the display 14, the layout of a navigation screen may include a relatively high level of detail, such as secondary roads and/or roads that are not part of a calculated route to a specified destination, icons for lodging, fuel, food and other points of interest, text and/or iconic direction cues, and so forth. When the user is relatively far from the display 14, the layout of a navigation screen may include a relatively low level of detail, such as only roads that are part of the route to a specified destination, minimal on-screen directional cues and other icons that may clutter the display 14 for distance viewing.

In one embodiment, the face detection and distance determination may include determining an offset of the user's face to a center of the display 14. If the user is directly in front of the display 14 and, depending on the relative location of the imaging device 16 to the display 14, the detected face of the user may appear in a center region of the video stream output by the image device 16. In this situation, the displayed content may be display based on the distance between the user and the display 14 as described above. But if the detect face of the user is offset from a center portion of the video stream or otherwise calculated to be viewing the display 14 at an angle, then the displayed content may be adjusted based on a calculated viewing angle to the display 14. In one embodiment, if the user is at an angle to the display 14, the displayed content may be "skewed" so as to be non-uniformly sized across the display 14. For example, if the user is determined to be viewing the display 14 from the right, content on the left-hand side of the display 14 may be displayed with a larger size than content on the right-hand side of the display 14. Similarly, if the user is determined to be viewing the display 14 from the left, content on the right-hand side of the display 14 may be displayed with a larger size than content on the left-hand side of the display 14. Also, if the user is determined to be viewing the display 14 from above, content on the bottom of the display 14 may be displayed with a larger size than content on the top of the display 14. Similarly, if the user is determined to be viewing the display 14 from below, content on the top of the display 14 may be displayed with a larger size than content on the bottom of the display 14.

In this manner, the angle and/or tilt of content may be manipulated in pseudo-three dimensional space to make it easier for the user to read or view the content from various directions. The adjustments to the graphics may take into account the quality of the display, such as known viewing angle parameters (e.g., maximum angle from center that the display may be clearly viewed and a smaller angle at which viewing quality starts to degrade), in order to optimize the appearance of content. Also, portions of the display that may not be viewable from the angle to the user may be dimmed or turned off.

In one embodiment, the orientation of the user relative to the orientation of the electronic device 10 may be determined. For example, the electronic device 10 of FIG. 1 is shown in a vertical orientation and the eyes of a vertically oriented user positioned in front of the display 14 may be laterally offset from one another. But if the user were to rotate the electronic device 10 to be horizontal, or if the user were to change his or her position with respect to the electronic device 10, then the eyes may be detected to be vertically offset from one another. Upon such a determination, the content displayed on the display may be rotated to match the relative orientation of the electronic device 14 and the user.

The manner in which the display management function 12 changes displayed content may be based on default settings of the electronic device 10. Alternatively, the user may be involved in setting how and when the display management function 12 changes displayed content as a function of user distance to the display 14. In one embodiment, if face recognition is used, the identity of the user may be ascertained and the displayed content may be adjusted based on the user's preferences for visual layout and/or font size.

As indicated, the illustrated electronic device 10 shown in FIGS. 1 and 2 is a mobile telephone. Features of the electronic device 10, when implemented as a mobile telephone, now will be described. The electronic device 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

The display 14 displays information to the user such as operating state, time, telephone numbers, contact information, various menus, etc., that enable the user to utilize the various features of the electronic device 10. The display 14 also may be used to visually display content received by the electronic device 10 and/or retrieved from a memory 34 (FIG. 2) of the electronic device 10. The display 14 may be used to present images, video and other graphics to the user, such as photographs, mobile television content and video associated with games.

A keypad 36 provides for a variety of user input operations. For example, the keypad 36 may include alphanumeric keys for allowing entry of alphanumeric information such as telephone numbers, phone lists, contact information, notes, text, etc. In addition, the keypad 36 may include special function keys such as a "call send" key for initiating or answering a call, and a "call end" key for ending or "hanging up" a call. Special function keys also may include menu navigation and select keys to facilitate navigating through a menu displayed on the display 14. For instance, a pointing device and/or navigation keys may be present to accept directional inputs from a user. Keys or key-like functionality also may be embodied as a touch screen associated with the display 14. Also, the display 14 and keypad 36 may be used in conjunction with one another to implement soft key functionality.

The electronic device 10 includes call circuitry that enables the electronic device 10 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The electronic device 10 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds), and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging multimedia messages. Processing data may include storing the data in the memory 34, executing applications to allow user interaction with the data, displaying video and/or image content associated with the data, outputting audio sounds associated with the data, and so forth.

FIG. 2 represents a functional block diagram of the electronic device 10. For the sake of brevity, many features of the electronic device 10 will not be described in great detail. The electronic device 10 includes a primary control circuit 38 that is configured to carry out overall control of the functions and operations of the electronic device 10. The control circuit 20 may include a processing device 40, such as a central processing unit (CPU), microcontroller or microprocessor. The processing device 40 executes code stored in a memory (not shown) within the control circuit 38 and/or in a separate memory, such as the memory 34, in order to carry out operation of the electronic device 10. The memory 34 may be, for example, one or more of a buffer, a flash memory, a hard drive, a removable media, a volatile memory, a non-volatile memory, a random access memory (RAM), or other suitable device. In a typical arrangement, the memory 34 may include a non-volatile memory (e.g., a flash memory) for long term data storage and a volatile memory (e.g., RAM) that functions as system memory for the control circuit 38. The memory 34 may exchange data with the control circuit 38 over a data bus. Accompanying control lines and an address bus between the memory 34 and the control circuit 38 also may be present.

In addition to other application, the processing device 40 may execute code that implements the display management function 12. While the display management function 12 is executed by the processing device 40 in accordance with an embodiment, such functionality could also be carried out via dedicated hardware or firmware, or some combination of hardware, firmware and/or software.

Continuing to refer to FIGS. 1 and 2, the electronic device 10 includes an antenna 42 coupled to a radio circuit 44. The radio circuit 44 includes a radio frequency transmitter and receiver for transmitting and receiving signals via the antenna 42. It will be appreciated that the illustrated antenna 42 and radio circuit 44 may represent one or more than one radio access transceivers. The radio circuit 44 may be configured to operate in a mobile communications system and may be used to send and receive data and/or audiovisual content. Receiver types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMax, digital video broadcasting-handheld (DVB-H), integrated services digital broadcasting (ISDB), etc., as well as advanced versions of these standards.

The electronic device 10 further includes a sound signal processing circuit 46 for processing audio signals transmitted by and received from the radio circuit 44. Coupled to the sound processing circuit 46 are a speaker 48 and a microphone 50 that enable a user to listen and speak via the electronic device 10 as is conventional. The radio circuit 44 and sound processing circuit 46 are each coupled to the control circuit 38 so as to carry out overall operation. Audio data may be passed from the control circuit 38 to the sound signal processing circuit 46 for playback to the user. The audio data may include, for example, audio data from an audio file stored by the memory 34 and retrieved by the control circuit 38, or received audio data such as in the form of streaming audio data from a mobile radio service. The sound processing circuit 46 may include any appropriate buffers, decoders, amplifiers and so forth.

The display 14 may be coupled to the control circuit 38 by a video processing circuit 52 that converts video data to a video signal used to drive the display 14. The video processing circuit 52 may include any appropriate buffers, decoders, video data processors and so forth. The video data may be generated by the control circuit 38, retrieved from a video file that is stored in the memory 34, derived from an incoming video data stream that is received by the radio circuit 44 or obtained by any other suitable method.

The electronic device 10 may further include one or more I/O interface(s) 54. The I/O interface(s) 54 may be in the form of typical mobile telephone I/O interfaces and may include one or more electrical connectors. As is typical, the I/O interface(s) 54 may be used to couple the electronic device 10 to a battery charger to charge a battery of a power supply unit (PSU) 56 within the electronic device 10. In addition, or in the alternative, the I/O interface(s) 54 may serve to connect the electronic device 10 to a headset assembly (e.g., a personal handsfree (PHF) device) that has a wired interface with the electronic device 10. Further, the I/O interface(s) 54 may serve to connect the electronic device 10 to a personal computer or other device via a data cable for the exchange of data. The electronic device 10 may receive operating power via the I/O interface(s) 54 when connected to a vehicle power adapter or an electricity outlet power adapter. The PSU 56 may supply power to operate the electronic device 10 in the absence of an external power source.

The electronic device 10 also may include a system clock 58 for clocking the various components of the electronic device 10, such as the control circuit 38 and the memory 34.

In addition to the imaging device 16, the electronic device 10 may include a camera 60 for taking digital pictures and/or movies. Typically, a field of view of the camera 60 has generally an opposite direction as the field of view of the imaging device 16. Image and/or video files corresponding to the pictures and/or movies captured by the camera 60 may be stored using the memory 34.

The electronic device 10 also may include a position data receiver 62, such as a global positioning system (GPS) receiver, Galileo satellite system receiver or the like. The position data receiver 62 may be involved in determining the location of the electronic device 10 and/or may provide location information to a navigation and/or mapping application.

The electronic device 10 also may include a local wireless interface 64, such as an infrared transceiver and/or an RF interface (e.g., a Bluetooth interface), for establishing communication with an accessory, another mobile radio terminal, a computer or another device. For example, the local wireless interface 64 may operatively couple the electronic device 10 to a headset assembly (e.g., a PHF device) in an embodiment where the headset assembly has a corresponding wireless interface.

Figure 8:
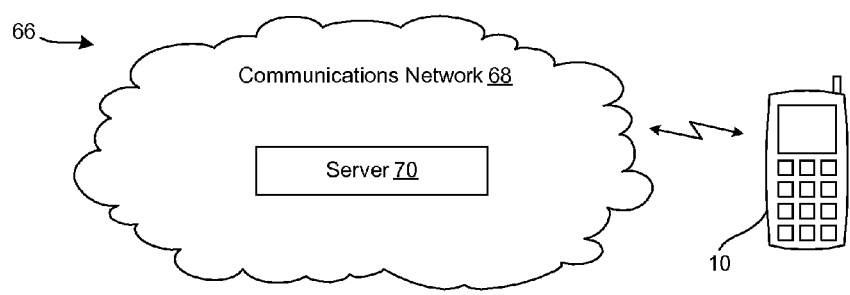
FIG. 8 is a schematic diagram of a communications system in which the mobile telephone of FIG. 1 may operate.

With additional reference to FIG. 8, the electronic device 10 may be configured to operate as part of a communications system 66. The system 66 may include a communications network 68 having a server 70 (or servers) for managing calls placed by and destined to the electronic device 10, transmitting data to the electronic device 10 and carrying out any other support functions. The server 70 communicates with the electronic device 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 68 may support the communications activity of multiple mobile telephones 10 and other types of end user devices. As will be appreciated, the server 70 may be configured as a typical computer system used to carry out server functions and may include a processor configured to execute software containing logical instructions that embody the functions of the server 70 and a memory to store such software.

Although certain embodiments have been shown and described, it is understood that equivalents and modifications falling within the scope of the appended claims will occur to others who are skilled in the art upon the reading and understanding of this specification.

What is claimed is:

1. A method of controlling visual content that is displayed on a display of an electronic device, comprising:

analyzing a video signal to detect facial features of a user of the electronic device and to establish a parameter indicative of a distance of the user form the display based on the detected facial features; and adjusting the displayed content based on the parameter to facilitate user viewing of the displayed content at the indicated distance by varying a layout of a plurality of windows displayed on the display so that the plurality of windows are displayed in one of a side-by-side arrangement when the user is less than a predetermined distance from the display or an overlapping arrangement when the user is greater than the predetermined distance from the display; and wherein the analyzing further includes determining a viewing angle of the user with respect to the display and the adjusting further includes skewing the displayed content so as to be non-uniformly varying in size across the display based on the viewing angle.

2. The method of claim 1, wherein the parameter is derived from a relationship between at least two of the detected facial features.

3. The method of claim 1, wherein the analyzing further includes determining a relative orientation of the user to the electronic device about an axis formed between the user's eyes and the display of the electronic device and the adjusting further includes rotating the orientation of the displayed content to match the relative orientation of the user and the electronic device about the axis.

4. The method of claim 1, wherein the displayed content is content other than the video signal, and the adjusting further includes changing a layout of visual elements from the displayed content, wherein the changing the layout of visual elements further includes changing a selection and arrangement of visual elements that make up the displayed content.

5. The method of claim 4, wherein the content includes an image and a size of the image is changed by scaling the image.

6. The method of claim 4, wherein the content includes text and the size of the text is changed by at least one of changing point size of the text or changing a font of the text.

7. The method of claim 4, wherein when the indicated distance is less than a predetermined threshold, the displayed content includes a plurality of items of visual content; and the method further includes detecting that the indicated distance has increased to be greater than the predetermined threshold and, upon the detection, the changing the layout includes removing at least one of the plurality of displayed items from the display and increasing a size of a remaining one of the items.

8. An electronic device, comprising:

an imaging device that generates a video signal containing a representation of a user of the electronic device;

a display that displays visual content to the user; and a controller configured to analyze the video signal to detect facial features of the user of the electronic device and establish a parameter indicative of a distance of the user from the display based on the detected facial features, and wherein the controller adjusts the displayed content based on the parameter to facilitate user viewing of the displayed content at the indicated distance by varying a layout of a plurality of windows displayed on the display so that the plurality of windows are displayed in one of a side-by-side arrangement when the user is less than a predetermined distance from the display or an overlapping arrangement when the user is greater than the predetermined distance from the display.

9. The electronic device of claim 8, wherein the parameter is derived from a relationship between at least two of the detected facial features.

10. The electronic device of claim 8, wherein the controller is further configured to determine a relative orientation of the user to the electronic device about an axis formed between the user's eyes and the display of the electronic device and rotate the orientation of the displayed content to match the relative orientation of the user and the electronic device about the axis.

11. The electronic device of claim 8, wherein the displayed content is content other than the video signal, and the controller changes a layout of visual elements from the displayed content, wherein the change in layout of visual elements includes a change in a selection and arrangement of visual elements that make up the displayed content.

12. The electronic device of claim 11, wherein the content includes an image and a size of the image is changed by scaling the image.

13. The electronic device of claim 11, wherein the content includes text and the size of the text is changed by at least one of changing point size of the text or changing a font of the text.

14. The electronic device of claim 11, wherein when the indicated distance is less than a predetermined threshold, the displayed content includes a plurality of items of visual content; and the controller is further configured to detect that the indicated distance has increased to be greater than the predetermined threshold and, upon the detection, the change in layout includes removing at least one of the plurality of displayed items from the display and increasing a size of a remaining one of the items.

15. The electronic device of claim 8, wherein the controller is further configured to determine a viewing angle of the user with respect to the display and the adjustment to the displayed content further includes skewing the displayed content so as to be non-uniformly varying in size across the display based on the viewing angle.

* * * * *